E. FRIEDERICH.
INCLOSED ARC LAMP AND METHOD OF STARTING THE SAME.
APPLICATION FILED JAN. 28, 1916. RENEWED DEC. 7, 1921.

1,422,553.

Patented July 11, 1922.
2 SHEETS—SHEET 1.

Inventor:
Ernst Friederich,
by
His Attorney.

E. FRIEDERICH.
INCLOSED ARC LAMP AND METHOD OF STARTING THE SAME.
APPLICATION FILED JAN. 28, 1916. RENEWED DEC. 7, 1921.

1,422,553.

Patented July 11, 1922.
2 SHEETS—SHEET 2.

Inventor:
Ernst Friederich,
by
His Attorney.

UNITED STATES PATENT OFFICE.

ERNST FRIEDERICH, OF BERLIN, GERMANY, ASSIGNOR TO GENERAL ELECTRIC COMPANY, A CORPORATION OF NEW YORK.

INCLOSED-ARC LAMP AND METHOD OF STARTING THE SAME.

1,422,553. Specification of Letters Patent. Patented July 11, 1922.

Original application filed October 13, 1914, Serial No. 866,438. Divided and this application filed January 28, 1916, Serial No. 74,935. Renewed December 7, 1921. Serial No. 520,719.

*To all whom it may concern:*

Be it known that I, ERNST FRIEDERICH, a subject of the King of Prussia, residing at Berlin, Germany, have invented certain new and useful Improvements in Inclosed-Arc Lamps and Methods of Starting the Same, of which the following is a specification.

This application is a division of my prior application, Serial No. 866,438, filed October 13, 1914.

The present invention comprises a lamp in which an arc is operated in an inclosed envelope between electrodes of refractory material, such, for example, as tungsten, in an indifferent atmosphere, the electrodes being proportioned to be heated to incandescence and remaining substantially intact or unconsumed when supporting an arc discharge.

It is one of the features of my invention to operate the arc in a vapor which will render the arc luminous, for example, mercury vapor, at relatively considerable pressure, preferably approximating atmospheric pressure.

Another feature of my invention comprises a lamp in which the series resistance required for steadying the arc is also operated at incandescence in the enclosing envelope and contributes light, thereby still further increasing the efficiency of the lamp and also improving the color of the light.

Other features of my invention comprise various means for heating one or more of the electrodes preliminary to and for the purpose of starting the arc.

Figure 1:
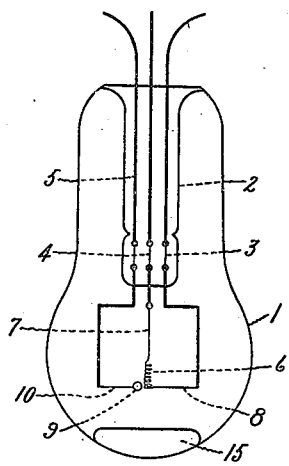
Figure 14:
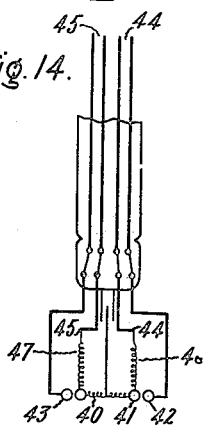
Figure 15:
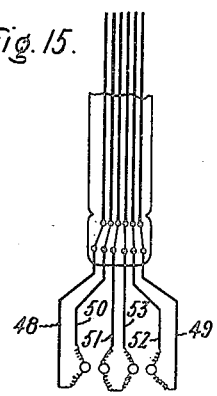

The above and various other aspects of my invention are pointed out in the appended claims and will be better understood from the following description taken in connection with the accompanying drawings, of which Fig. 1 shows somewhat diagrammatically a simple form of direct current arc lamp embodying my invention; Figs. 2 to 7 are modifications; Figs. 8 to 11 illustrate a lamp in which a heated electrode distinct from the main electrodes is used to start the arc; Figs. 12 and 13 also show lamps in which the steadying resistance is used as a light source; Figs. 14 and 15 illustrate particular arrangements for operating a plurality of arcs in the same envelope, and Figs. 16 to 19 illustrate diagrammatically circuit connections for starting the lamp.

As shown in Fig. 1, the lamp consists of an enclosing globe 1 provided as usual with a stem 2 into which are sealed leading-in conductors 3, 4 and 5. The electrodes in the simplest type of lamp shown in Figs. 1 to 7, inclusive, include an electrode 6 consisting of tungsten, or other suitable refractory material, preferably closely coiled to reduce the cooling effect of the gas, and having its terminals 7, 8 joined in turn to leading-in wires 3, 4. Heating current is supplied thereby to initially heat the electrode 6. This heating current may be furnished by a separate source of energy of suitable voltage, or by the main source of energy for operating the lamp, in which case the coil 6 is preferably connected in series with a suitable external or internal resistance, as will be hereinafter explained in connection with some of the other figures.

Figure 2:
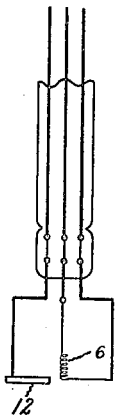
Figure 3:
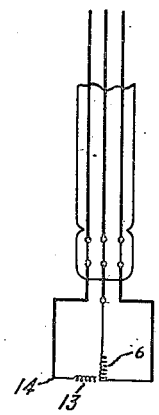

The cooperating electrode 9 may consist either of a small metallic globule attached mechanically or by welding to a conductor 10 of smaller cross-section, or, as shown, in Fig. 2, may consist of a small rod 12 of metal, or, as shown in Fig. 3, it may consist of a closely coiled spiral 13 attached at one end only to a terminal conductor 14.

The envelope 1 is filled with a gas inert with respect to the metal constituting the electrodes. Various indifferent gases, such as nitrogen, argon, or a mixture of these gases, may be used for this purpose, but preferably I employ a vapor, for example, a metal vapor, such as mercury, which renders the arc luminous. In indifferent fixed gases, such as nitrogen or argon, the arc voltage is relatively low, for example, with a slight separation of the electrodes in a lamp filled with an atmosphere of nitrogen having an efficiency of about one-half watt per candle power, an arc may be sustained with an impressed potential of about 50 volts, and under similar conditions in an argon atmosphere an arc may be sustained at about 15 to 20 volts. When using a filling of mercury vapor, furnished, for example, by a globule of metallic mercury 15, there is preferably also present an indifferent gas, such as nitrogen, at relatively low pressure.

The pressure of the gaseous filling preferably is so chosen that at the operating temperature of the lamp, the gaseous pressure is of the order of magnitude of one atmosphere. In the same manner when using a mercury filling, the lamp should be so proportioned as to operate at a temperature at which the vaporized mercury will have a pressure of the order of magnitude of one atmosphere. In some cases, however, the desirable characteristics of the arc may be obtained at lower pressures, at which the arc starts at a lower voltage.

Instead of mercury, other vapors or gases which impart luminosity to the arc may be used, for example, neon, or vaporized salts, for example, thallium tetrachloride (chlorür) or aluminum chloride, either alone, or mixed with one another or with indifferent gases. Oxides such as calcium oxide and magnesium oxide may be placed in the neighborhood of the arc and assist in the production of light either in the solid or vaporized state. Oxides, such for example, as magnesium oxide, aluminum oxide, zirconium oxide and thorium oxide may be admixed with the tungsten constituting the electrodes.

The particular configuration of the electrodes may be varied as desired, but they preferably should be of such dimensions and the connecting conductor should be so proportioned at the point of union with the electrodes that the electrodes will operate at a temperature at which the efficiency of light production by incandescence is higher than at the temperature at which said electrodes could be operated with the same useful life in a vacuum. As the efficiency increases very rapidly with the temperature, a net gain of efficiency may be obtained by operating at higher temperature in an inert gas even though heat is lost by gas convection currents.

Globular electrodes may be made by melting ductile tungsten wires or pressed filament in an arc. The electrodes may also be made by pressing tungsten, or other powder, into desired form and then sintering. Experiments have shown that the diameter of the globules should be about ten times the diameter of the stem. As compared with the stem, the globule has a greater cubical content for its surface. By thus crowding the source of light into a small space, the heat losses to the surrounding gas are materially reduced. Similarly, spirals act, as far as heat losses are concerned, like cylinders of the same size.

Figure 4:
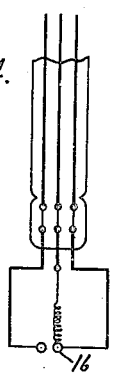
Figure 5:
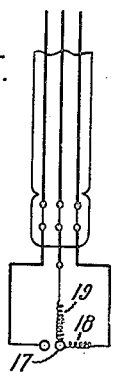

In some cases it is preferable to provide the initially heated electrode 6 with a thickened portion or with a globule of metal similar in shape to the cooperating electrode, as shown at 16 in Fig. 4, to prevent over-heating of the spiral conductor. In some cases this small metal button or globule can to advantage be attached to an angle in the heated conductor mechanically or by welding, as shown at 17 in Fig. 5. With such a construction, part of the heated conductor, for example, section 18 operates in series with section 19 only during the starting of the lamp and enables the full working voltage to be employed for starting. During the operation of the arc, section 18 is cut out, section 19 operates in series with the arc and acts as a ballast resistance, thus adding to the efficiency of the lamp, as it may be operated at intense incandescence in an atmosphere of inert gas. The color of the light given by section 19 and the color of the arc can be advantageously made the complement of each other.

The lamps described in connection with Figs. 1 to 5 can be operated on alternating current by first making suitable connections to bring the spiral electrode 6 to incandescence and then applying potential between electrode 6 and the cooperating electrode, for example, electrode 9, Fig. 1, but when direct current is used, care must be exercised to make the heated electrode 6 the cathode.

Figure 16:
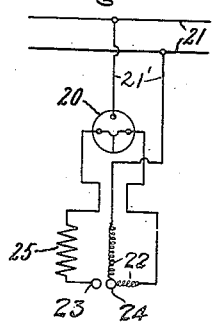
Figure 17:
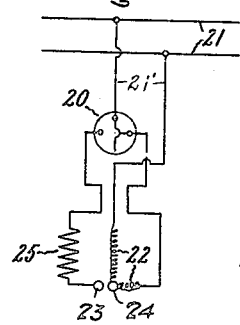
Figure 18:
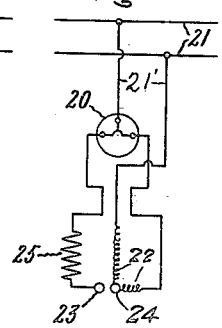
Figure 19:
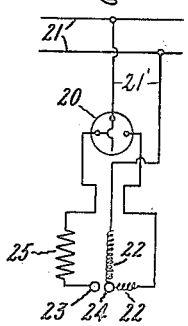

One method of starting the lamp is shown in detail by Figs. 16 to 19, inclusive. In Fig. 16, the three-point switch 20 is in the off position. As shown in Fig. 17, it first completes a circuit from a source of current represented by the conductors 21 through the conductors 21 to the coiled wire 22. When the coil 22 has been brought to bright incandescence, the switch 20 is turned, as shown in Fig. 18, to connect the cooperating electrode 23 to the positive terminal of the energy supply. As shown in Fig. 19, the next turn of the switch opens the circuit from the current supply through the heated spiral 22 so that an arc springs between the separated electrodes 23 and 24, making the electrode 24 the cathode. It is often advantageous to heat the cathode to a higher temperature at starting than it is heated when the arc is operating, thereby making starting easier.

In Figs. 16 to 19, a separate series resistance 25 is shown in circuit with the electrode 23, but this is unnecessary if the section of heated electrode operating in series with the arc is suitably proportioned to act as a steadying resistance.

Figure 6:
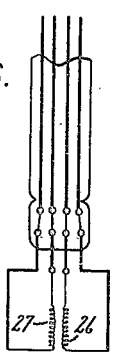
Figure 7:
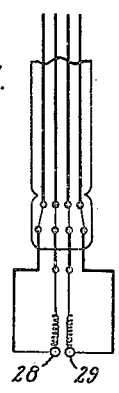

The necessity of carefully making the heating electrode the cathode and operating the lamp with direct current makes it desirable in some cases to adapt both electrodes to be heated externally, as shown in Figs. 6 and 7, in which both electrodes 26 and 27, Fig. 6, consist of short heavy spirals of tungsten wire. Of course, in this case thickened portions or globules 28, 29, Fig. 7, may also be provided, located at a shorter distance to each other than the rest of the electrodes so that the arc will have its seat at the thickened portions.

Figure 8:
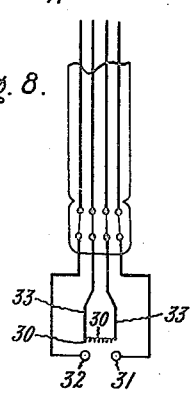
Figure 9:
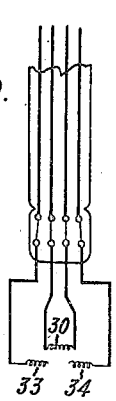
Figure 10:
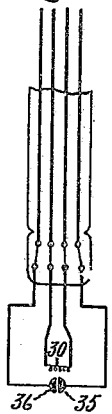
Figure 11:
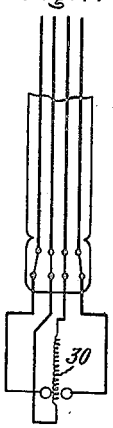
Figure 12:
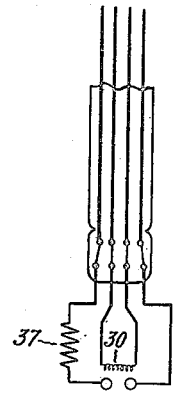
Figure 13:
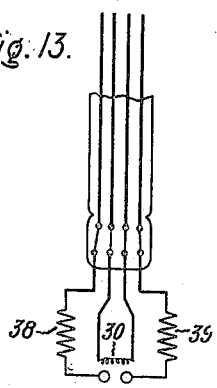

In Figs. 8 to 13, inclusive, various arrangements have been shown in which a heated electrode distinct from the main working electrodes is employed for starting the lamp, this electrode being subsequently cut out of circuit. As shown in Fig. 8, the starting electrode 30 consists of a closely wound spiral similar in construction to the electrode 6, Fig. 1, and located about the same distance from the working electrodes 31, 32, as these electrodes are separated from each other. A heating current is first passed by means of conductors 33 through the spiral 30 and voltage suitable for sustaining an arc is impressed between electrode 30 as cathode and electrode 31 as anode. When electrode 31 has reached bright incandescence, the polarity is reversed so as to make the electrode 31 negative. As the globular electrode 31 has been heated by the arc, it can operate as a cathode. The electrode 32 then is connected to the positive terminal of the energy supply so that when the electrode 30 is disconnected, the arc will spring to the electrode 32 and continue to operate. The construction of Fig. 9 is similar to that already described, except for the shape of the main electrodes 33, 34, which are closely wound spirals similar to the electrode 13, Fig. 3. The main working electrodes 35, 36 in Fig. 10 are shaped hemispherically so that a very short arc may be operated between them. Although for the sake of clearness, the heated electrode 30 of Figs. 8 to 10 has been shown above both the main working electrodes, it may likewise be located in other positions, such as shown in Fig. 11, in which it is positioned vertically. It may also to advantage be located under the arcing electrodes.

The heater wire preferably is so proportioned that the entire voltage utilized in the operation of the lamp can be consumed by the same immediately when switching in the lamp. Thereby an external series resistance otherwise necessary is eliminated. In order to minimize the shock of the initial current through the heater wire, only the part of the heater wire 30 acting directly as electrode may be made of tungsten, the remainder may consist of metal with a smaller temperature coefficient or still better of material with a negative temperature resistance coefficient as carbon or boron. The heating current may be decreased by constituting the heater wire an oxide cathode, for example, as a spiralled or stranded wire, between the turns of which, oxides, such as calcium oxide, have been placed.

When using a starting electrode which is cut out during the operation of the lamp, it is necessary to operate a separate resistance in series with the arc in order to steady the same. This resistance is preferably for the sake of increased efficiency located within the lamp envelope as already described in connection with Fig. 5. In Fig. 12, the resistance 37 has been shown located in series with one electrode and in Fig. 13 two resistances 38, 39 have been shown in series respectively with the two electrodes for the sake of symmetry. The resistances preferably consist of tungsten and are proportioned to operate at a high efficiency. The efficiency and color of the light are thereby improved.

In some cases it is desirable to operate a plurality of arcs in a single envelope, for example, when it is desirable to use higher operating voltages or higher operating currents. In the former case the arcs are operated in series and the latter in parallel. In Fig. 14 an arrangement is shown in which there are provided two heated electrodes 40, 41. Two unheated electrodes 42, 43 are located respectively adjacent to said heated electrodes. A heating current is first passed by means of conductors 44, 45 through the spirals 46, 47 in series and then the arcs are started by a current of suitable potential between electrodes 41, 42 and 40, 43 respectively in a manner already described in connection with the other figures.

In Fig. 15 each of the electrodes is adapted to be heated, the conductors 48, 49 being initially connected to the terminals of the energy supply and the conductors 50, 51 and 52, 53 respectively connected to each other. When thus the entire length of spiral is heated to incandescence, the connections between the conductors 50 and 51 and also between conductors 52 and 53 are successively opened, thereby starting the arcs.

Some of the advantages to be gained with a lamp made as above described are high efficiencies ranging from $\frac{1}{2}$ to $\frac{1}{5}$ watts per candle, the possibility of making high efficiency lamps of low candle power and as contrasted with other arc lamps steadiness of light, absence of regulating mechanism and the fact that no tending or trimming is required.

What I claim as new, and desire to secure by Letters Patent of the United States, is:—

1. An electric arc device comprising the combination of a sealed envelope, refractory metal electrodes therein adapted to operate at incandescence and remaining substantially intact when supporting an arc discharge, and a supply of vaporizable halogen salt having a luminous spectrum for imparting light of desired color to an arc between said electrodes.

2. An electric lamp comprising the combination of a sealed envelope, tungsten electrodes therein adapted to operate at incandescence, and a supply of a vaporizable halogen salt, said salt having a luminous spectrum for imparting light of desired color to an arc between said electrodes.

3. An electric lamp comprising the combination of electrodes of highly refractory metal of low vapor pressure, such as tungsten, at least one of which is adapted to operate at incandescence, a gas indifferent chemically with respect to said electrodes at the operating temperature, and a halogen compound which is gaseous at the operating temperature of the device for imparting luminosity to an arc between said electrodes.

4. An electric arc device comprising the combination of electrodes of highly refractory metal of low vapor pressure, such as tungsten, at least one of which is adapted to operate at incandescence, a gas indifferent chemically with respect to said electrodes at the operating temperature, a supply of aluminum chloride for imparting luminosity to an arc between said electrodes, and an enclosing envelope.

5. An electric arc device comprising the combination of a sealed envelope, tungsten electrodes therein adapted to operate at incandescence, a supply of a halogen compound which is gaseous at the operating temperature of said device and having a luminous spectrum for imparting light of desired color to an arc between said electrodes, and means for operating an arc between said electrodes.

6. The combination of an envelope, main electrodes therein adapted to be heated to incandescence by an arc operating between said electrodes, but not incandescible independently, an auxiliary electrode arranged to be heated by passage of current, gas within said envelope, and connections for operating an arc between said auxiliary electrode and a main electrode preliminary to starting an arc between said main electrodes.

7. An electrical device comprising a sealed envelope, a gas filling therein, main electrodes therein adapted to be heated to incandescence by an arc operating between said electrodes but not incandescible independently, an auxiliary electrode incandescible by passage of current, means for operating an arc between said auxiliary electrode while heated and one of the main electrodes, and means for starting and operating an arc between said main electrode while heated and the cooperating main electrode.

8. An electrical arc device comprising a sealed envelope, main tungsten electrodes therein each comprising a globule mounted on a stem of smaller cross-section, a filamentary electrode adapted to be independently heated, an indifferent gas, means for operating an arc between said filamentary electrode while heated and one of said main electrodes, and means for starting an arc between said main electrodes while the auxiliary arc is operating.

9. The method of starting an arc between cooperating electrodes of refractory material, the cathode not being adapted to be heated independently, which consists in starting an arc between said cathode and an auxiliary electrode which is independently heated and when said cathode is at incandescence impressing a current upon said incandescent electrode and the cooperating electrode, the polarity and voltage of said current being chosen to make said incandescent electrode functionate as cathode.

10. An electric arc device comprising a sealed envelope, main refractory electrodes therein adapted to pass current only through an intervening gap, an auxiliary electrode adapted to be heated independently by passage of current, a gas having a pressure high enough to permit an arc discharge, means for operating an arc between said auxiliary electrode while heated and one of said main electrodes, and means for operating an arc between said main electrodes while the main electrode is heated to incandescence by the arc operating between the same and the auxiliary electrode.

11. An electric arc device comprising the combination of a sealed envelope, electrodes of tungsten therein operating at incandescence, a filling of argon gas and a quantity of aluminum chloride for imparting luminosity to a discharge between said electrodes.

In witness whereof, I have hereunto set my hand this 17th day of September, 1914.

ERNST FRIEDERICH.

Witnesses:
 HEINRICH DRÖNNER,
 HERMANN SCHRÖDER.